(12) United States Patent
Ludwig et al.

(10) Patent No.: US 7,004,667 B2
(45) Date of Patent: Feb. 28, 2006

(54) CONNECTION OF STREAMLINED-SECTION STRUTS

(75) Inventors: Peter Ludwig, Tuebingen (DE); Uwe Kaiser, Waiblingen/Neustadt (DE); Jens Henneberg, Hemmingen (DE)

(73) Assignee: Bosch Rexroth AG, Stuttgart (DE)

(*) Notice: Subject to any disclaimer, the term of this patent is extended or adjusted under 35 U.S.C. 154(b) by 0 days.

(21) Appl. No.: 10/610,196

(22) Filed: Jun. 30, 2003

(65) Prior Publication Data

US 2004/0033103 A1    Feb. 19, 2004

(30) Foreign Application Priority Data

Jul. 1, 2002    (DE) .......................... 202 10 133 U

(51) Int. Cl.
F16B 9/00    (2006.01)

(52) U.S. Cl. .................... 403/258; 403/231; 403/252; 403/253; 403/255; 403/257; 403/187; 52/655.1; 52/656.9

(58) Field of Classification Search ................ 403/187, 403/230, 231, 381, 252–259, 382, 403; 411/84, 411/85, 104; 52/655.1, 656.9
See application file for complete search history.

(56) References Cited

U.S. PATENT DOCUMENTS

| 3,088,197 | A |   | 5/1963  | Gargill |
| 3,161,145 | A |   | 12/1964 | Gargill et al. |
| 3,949,859 | A |   | 4/1976  | Nussbaumer et al. |
| 5,171,098 | A | * | 12/1992 | Jost .............. 403/252 |
| 5,173,001 | A | * | 12/1992 | Schunke ........... 403/252 |
| 5,231,932 | A |   | 8/1993  | Enderlein et al. |
| 5,481,842 | A | * | 1/1996  | Gautreau .......... 52/656.9 |
| 5,618,127 | A | * | 4/1997  | Tonsmann et al. ... 403/230 |
| 5,746,535 | A | * | 5/1998  | Kohler ............ 403/258 |
| 6,712,543 | B1 | * | 3/2004 | Schmalzhofer ..... 403/381 |

FOREIGN PATENT DOCUMENTS

| DE | 1 192 103   |   | 4/1965 |
| DE | 1 289 781   |   | 2/1969 |
| DE | 24 31 244   |   | 12/1975 |
| DE | 86 24 567.8 |   | 3/1988 |
| DE | 88 12 338   |   | 3/1990 |
| DE | 39 05 088   | * | 8/1990 |
| DE | 91 09 454   |   | 7/1991 |
| DE | 91 06 792   |   | 11/1992 |
| DE | 42 44 396 A1 |  | 6/1994 |
| DE | 94 20 726.7 |   | 4/1995 |
| DE | 195 16 775 A1 | | 11/1995 |

(Continued)

*Primary Examiner*—Daniel P. Stodola
*Assistant Examiner*—Michael P. Ferguson
(74) *Attorney, Agent, or Firm*—Michael J. Striker

(57) ABSTRACT

A connection (10) of two streamlined-section struts (12, 14) running orthogonally to one another with an essentially rectangular base cross section (18) uses a connector (16). The lateral surface (18a) of one (14) of the streamlined-section struts has a mounting groove (18b), as well as an edge flange (18c), which projects substantially orthogonally from an edge of this lateral surface (18a) at a predetermined distance (b). The connector (16) can be attached to the lateral surface (18a) of the one streamlined-section strut having the mounting groove (18b) and to the front side of the other streamlined-section strut (12). The contour of the connector (16) is accommodated substantially completely within the base cross section (18) of the other streamlined-section strut (12). In addition, the depth of the connector (16) is essentially the same as the predetermined distance (b).

13 Claims, 5 Drawing Sheets

FOREIGN PATENT DOCUMENTS

| | | |
|---|---|---|
| DE | 195 28 922 A1 | 4/1996 |
| DE | 195 17 276 A1 | 11/1996 |
| DE | 195 20 892 A1 | 12/1996 |
| DE | 195 38 350 A1 | 4/1997 |
| DE | 198 03 080 A1 | 7/1999 |
| DE | 100 05 646 A1 | 8/2001 |
| EP | 0 573 355 A1 | 12/1993 |

* cited by examiner

CONNECTION OF STREAMLINED-SECTION STRUTS

BACKGROUND OF THE INVENTION

The present invention relates to a connection of two streamlined-section struts running substantially orthogonally to one another with a substantially rectangular base cross section, whereby at least one of these streamlined-section struts has an edge flange, which projects from the edge of one of the lateral surfaces substantially orthogonally.

These types of connections of streamlined-section struts are used for assembly of ceilings, for example. In this connection, DE 86 24 567 U1 discloses the use of a connector for connecting streamlined-section struts with identical, essentially rectangular base cross sections, whose contour, likewise, is identical to the base cross section. Although in this document, streamlined-section struts with edge flanges are not mentioned and it can be concluded that the connection described in this document is not contemplated for streamlined-section struts, it should be noted that this connection for streamlined-section struts with an edge flange is also not or only conditionally suitable. And indeed, the edge flange of the second streamlined-section strut must be sawed or cut out at the points on which the first streamlined-section strut is to be attached. This must be done with very high precision, for one, such that the first streamlined-section strut also must be exactly attached to the desired position. For another, this sawing out signifies additional, valuable time in terms of processing. Finally, the subsequent attachment of streamlined-section struts in an existing streamlined-section strut assembly is made difficult, since an already mounted streamlined-sections strut must be sawed.

For further relevant state of the art, reference is made to DE 91 09 454 U1 and DE 198 03 080 A1.

In contrast, it is an object of the invention to provide a connection for streamlined-section struts by use of a connector, which, barring the precise trimming of the streamlined-section struts, can be manufactured more quickly without additional machining of the struts, and which makes possible the subsequent attachment of struts in an existing streamline-section strut assembly in a simple manner.

According to the present invention, this object is solved by a connection of a first streamlined-section strut with at least a second streamlined-section strut by use of a connector, whereby the at least second streamlined-section strut runs substantially orthogonally to the first strut, whereby the struts have a substantially rectangular base cross section, and the at least one second streamlined-section strut has a mounting groove in at least one of its lateral surfaces, as well as at least one edge flange, which projects substantially orthogonally from an edge of these lateral surfaces to a predetermined distance and has a predetermined thickness. The connector can be secured to a front side of the first streamlined-section strut. The contour of the connector is accommodated completely within the base cross section of this first streamlined-section strut, and the connector can also be secured to the lateral surface of the at least one second streamlined-section strut having the mounting groove. The dimensioning of the connector in a direction running essentially orthogonally to these lateral surfaces is essentially the same as the predetermined distance.

When the term "base cross section" is used in connection with the present invention, what is meant is the cross section of the streamlined-section strut without "accessories", such as mounting grooves or edge flanges.

On the basis of the inventive structure of the connector, the surface of the connector mounted to the second streamlined-section strut that faces toward the front face of the first streamlined-section strut connects essentially flush with the outer edge of the edge flange of the second streamlined-section strut. Thus, no parts are provided in the area of the contact surfaces for the first streamlined-section strut that would interfere with its mounting, which must be removed before the mounting of the first streamlined-section strut by cutting or sawing machining. This saves valuable machining time. Since accordingly, the previously described cutting or sawing is eliminated, with use of the connection of the present invention, the subsequent installation of streamlined-section struts in an already existing streamlined-section strut assembly is possible without further machining.

With use of such a streamlined-section strut assembly for providing an intermediate ceiling, the edge flanges serve for supporting the ceiling elements. Therefore, the streamlined-section struts have an edge flange (T-profile), preferably on two opposite lateral surfaces, respectively, so that the ceiling elements can contact with all four edges on an associated edge flange. In the region of the edges of the streamlined-section strut assembly, however, also the use of streamlined-section struts with an L-profile are contemplated. If one is satisfied with supporting the cover elements merely with two edges on edge flanges, then also the connection of T-profiles with pure rectangular profiles or in the edge area of the streamlined-section strut, the connection of L-profiles with pure rectangular profiles, is also possible.

For attachment of the connector to the front side of the first streamlined-section strut, the connector can have at least one through opening, through which an attachment element is inserted into an associated attachment recess provided in the front face of the first streamlined-section profile. As an attachment element, preferably a threaded bolt, for example, a countersunk screw is used. The use of self-forming or self-grooving threaded bolts is particularly preferred, since these require no preparatory work on the attachment recess. If the attachment recess of the first streamlined-section strut is designed as a threaded bore or in the attachment recess, a separate threaded sleeve is provided; however, also common threaded bolts can be used. As a further alternative, the attachment element can be formed as a drop-in pin.

The bore of the connector preferably is formed as a flat circular hole.

In the frame of manufacturing an L-connection (FIG. 5b), a T-connection (FIG. 5a), or an X-connection (FIG. 5c), the connector for attachment to the lateral surfaces of the second streamlined-section strut has at least one through opening, through which a further attachment element can be inserted into the mounting groove of the second streamlined-section strut. The further attachment element can be a screw bolt, for example, which cooperates with an associated nut element in the mounting groove. With a structure of the mounting groove as a T-groove, preferably a hammer-head nut is used. In order to enable symmetric conducting of the forces to be transferred into the second streamlined-section strut, preferably two further attachment elements are provided, which, for example, are arranged on both sides of the attachment element serving for attachment of the connector to the first streamlined-section strut. The at least one through opening is preferably formed as a flat circular hole.

In the frame of manufacturing a To-connection or an Xo-connection (FIG. 5d), an auxiliary element with at least one attachment shoulder projecting transversely over the cross section of the first streamlined-section strut can be attached for attachment of the connector, for example, to the lateral surfaces of the second streamlined-section strut to the side of the connector facing away from the first streamlined-section strut. This attachment shoulder can be inserted into the mounting groove and is securable therein. For example, this attachment shoulder can undercut the boundary flange of the T-assembly groove and can be fixed in this T-groove by means of at least one screw bolt or threaded pin in a frictionally-locked or form-locked manner, which can be screwed into an associated threaded bore of the attachment shoulder.

In a further form of the To- or Xo connection variation, the connector can have a recess for receiving a mounting section of the auxiliary element, in order to enable the most possible space for the arrangement of functional elements, for example, smoke detectors or sprinkler nozzles in the area of the space excluded from the streamlined-section strut.

For a simpler attachment of the auxiliary element to the connector, the same attachment element can be used that also serves for attaching the connector to the front face of the first streamlined-section strut. The auxiliary element can have a through opening for this purpose, preferably, a flat circular hole.

Although according to the previously described attachment of the connector with both streamlined-section struts in the frame of an L-, T-, or X-connection or by attachment of the connector with the first strut and the auxiliary element in the frame of a To- or Xo-connection, a plurality of attachment elements, in particular, a plurality of threaded bolts would be used, alternatively, also a quick clamping connector can be used, as is known, for example, from the Bosch Catalogue, "Mechanik-Grundelement" (Mechanical Base Elements), Version 8.0, pages 3–44.

For To- or Xo-connections, it is still to be added that the measured lengths of the connection originating from the attachment element with the first streamlined-section strut are measured in a plane stretching from the streamlined-section strut in an essentially orthogonally running direction, such that the connector with an L-, T-, or X-connection stands up in a first mounting orientation flush on the edge flange of the second streamlined-section strut, while it terminates in a second mounting orientation that is the reverse of the first mounting orientation with a To- or Xo-connection, essentially flush with the lower surface of the edge flange or the second streamlined-section strut. The surface of the streamlined-section strut assembly facing the space, therefore, has an essentially continuous appearance.

In the common manner, the first streamlined-section strut as well as the at least one second streamlined-section strut have a mounting groove, preferably formed as a T-groove, on two opposites sides, preferably, on all four sides of the base cross section. With the attachment of the connector to the streamlined-section strut, preferably, the following steps are follows: First, the connector is attached to the first streamlined-section strut. Next, the attachment to the second streamlined-section strut takes place, whereby one can access the attachment elements that serve for attachment to the second streamlined-section strut via mounting grooves of the first streamlined-section strut.

When the connector is secured to the first strut by means of a single attachment element, then it is advantageous to provide an anti-twist device of the connector about the longitudinal axis of the first streamlined-section strut, when at least one projection is provided on the side of the connector facing the first strut, which can be inserted in an associated recess in the front face of the first strut, preferably in a form-fitting manner.

In a further embodiment of the invention, the connector has the receiving recess surrounding the through openings, which, likewise, serve to receiving heads of the attachment elements.

To reduce the weight, in addition, it can be provided that in the upper surface of the connector facing the first strut and/or in the upper surface of the connector facing away from the first strut, at least one further recess is provided.

As previously noted, the mounting groove can be a longitudinal groove opening to the lateral surface, which, preferably, is undercut on both sides of its opening; that is, the mounting groove can be embodied as a T-groove.

The invention will next be described in more detail with reference to the accompanying figures.

DETAILED DESCRIPTION OF THE PREFERRED EMBODIMENTS

Figure 1A:
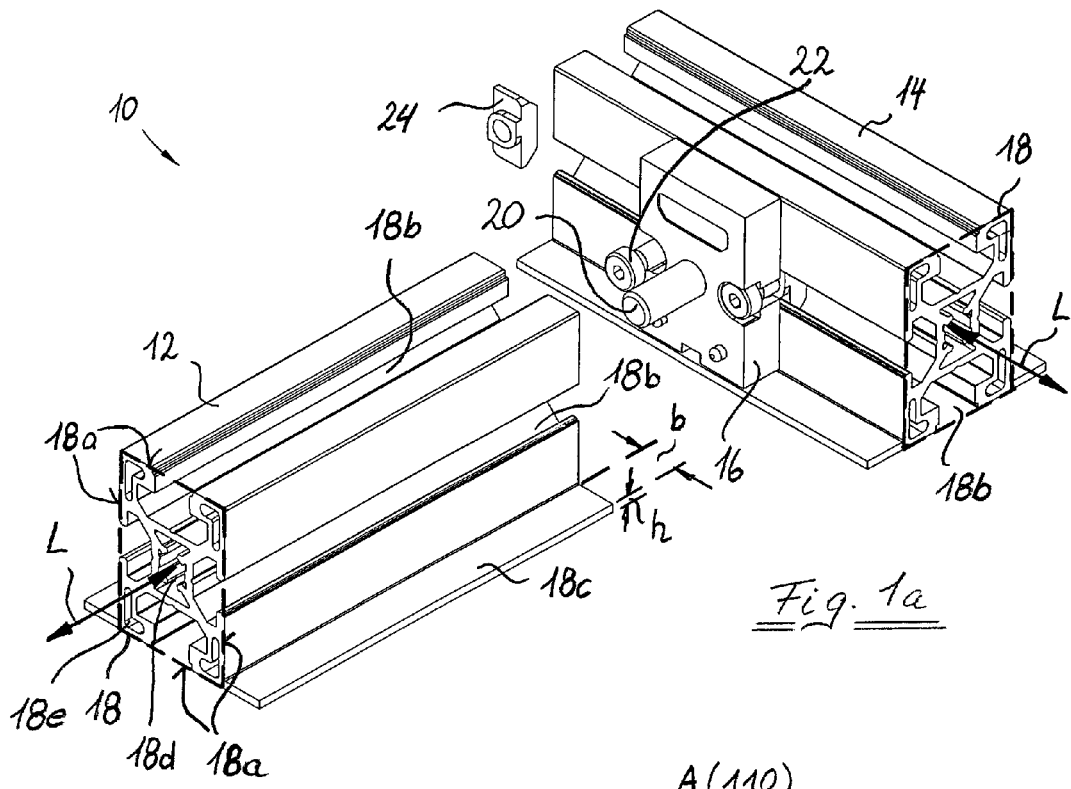
FIGS. 1a and 1b show perspective views for explanation of making of a T-connection of two streamlined-section struts.
Figure 1B:
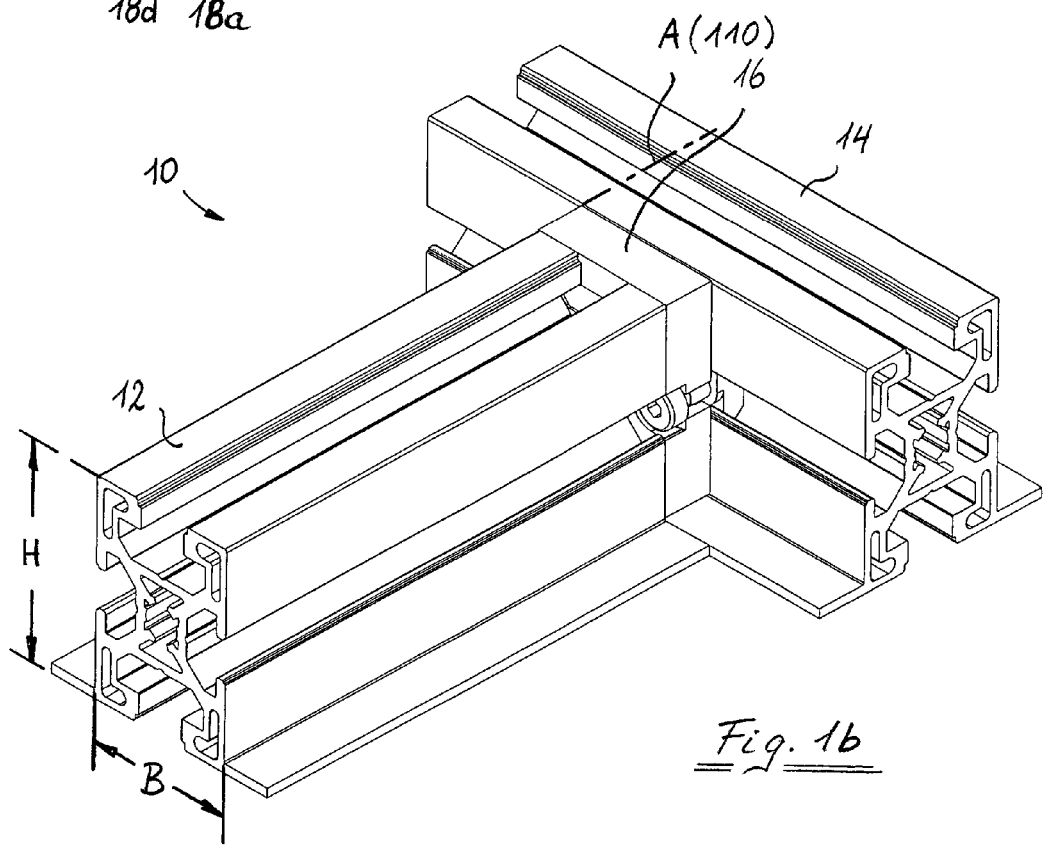

In FIGS. 1a and 1b, a T-connection 10 of a first streamlined-section strut 12 is shown with a second streamlined-section strut 14 with the use of a connector 16.

Both streamlined-section struts 12 and 14 have an identical, essentially rectangular base cross section 18 and extend in a longitudinal strut direction L. In each of the four lateral surfaces 18a of the streamlined-section struts 12, 14, a T-shaped mounting groove 18b is provided, that is a groove that opens toward a respective lateral surface 18a and is undercut on both sides of the opening. In addition, an edge flange 18c of a predetermined width b and a predetermined height h is provided each on two opposite lateral surfaces 18a at the edge. The height of the streamlined-section struts 12, 14 has the value H, and the width of the base cross section 18 has the value B, according to FIG. 1b.

Figure 3A:
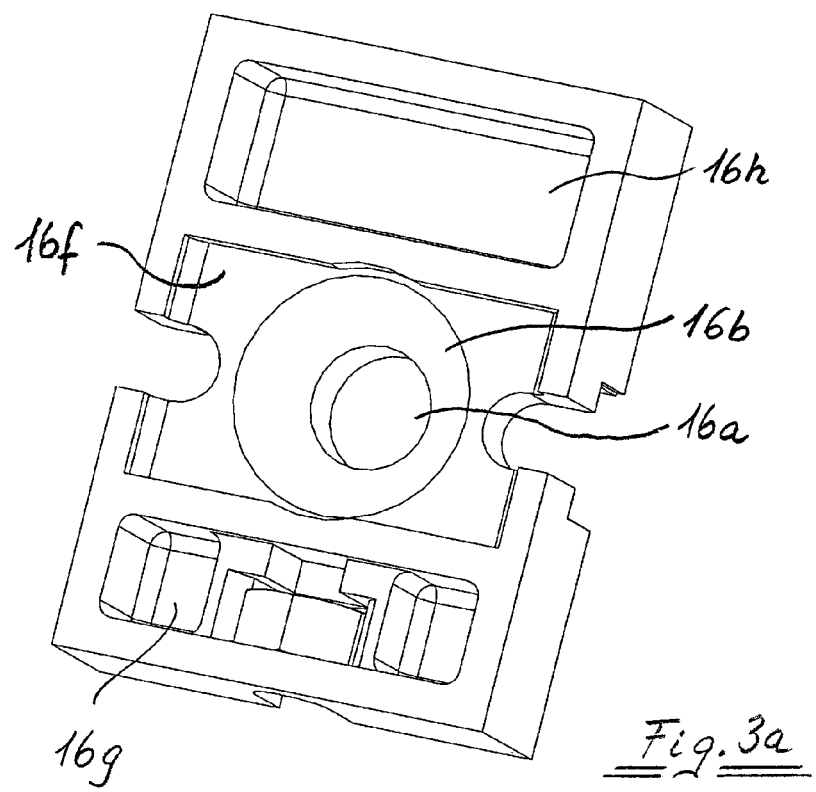
FIGS. 3a and 3b show a front view (FIG. 3b) and a back view (FIG. 3a) of connector used to create the connection of the present invention.
Figure 3B:
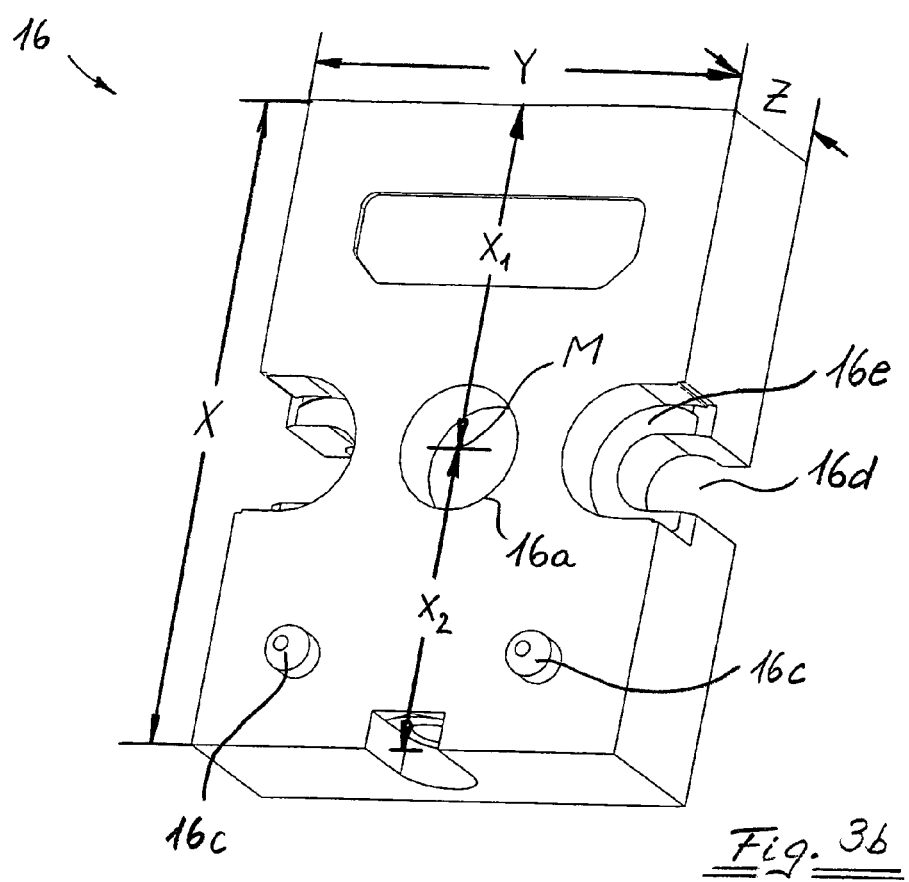

As can be seen in FIG. 3b, the connector 16 is generally quadrilateral-shaped with a height X, a width Y, and a depth Z. Thus, the height X of the connector 16 corresponds to the difference between the height H of the base cross section 18 and the height h of the edge flange 18c (X=H−h), the width Y of the connector 16 corresponds to the width B of the base cross section 18 (Y=B), and the depth Z of the connector 16 corresponds to the width b of the edge flange 18c (Z=b). In this manner, the outer peripheral surfaces of the connector 16 are essential flush with the outer surfaces of the streamlined-section struts 12, 14 in the mounted stated, according to FIG. 1b. For connection of the streamlined-section struts 12, 14, these require only a precise trimming at a section running orthogonally to the strut axis L and subsequent screwing to the connector 16. A further cut or sawed or otherwise material-removing machining of the streamlined-section struts 12, 14 is not necessary Although it appears in FIG. 1a that the connector 16 first is attached to the second strut 14, actually, first it is attached to the first strut 12. In this connection, a countersunk screw 20 penetrates a flat circular hole 16a of the connector 16, which is surrounded by a receiving recess 16b for the head of the countersunk screw 20 on the back side of the connector 16, according to FIG. 3a. The countersunk screw 20 engages in a central opening 18d of the strut 12, in which, for example, a threaded sleeve (not shown) can be inserted. In addition, two shoulders 16c on the front side of the connector 16 engage in an essentially form-fitting manner in the end sections of the cross bar of the T-shape of the mounting groove 18b of the streamlined-section strut 12, so that the connector 16 is secured relative to the streamlined-section strut 12 against a twisting about the longitudinal strut axis L.

In addition, one recognizes the L-shaped recesses 18e, which have no function, but serve only for material reduction.

For attachment of the connector 16 or the unit formed from the streamlined-section Strut 12 and the connector 16 with the second streamlined-section strut 14, two screw bolts 22 are placed in a respective mounting groove 18b of the streamlined-section strut 12 and moved in the longitudinal strut direction L towards the connector 16, until the shaft of the threaded bolts 22 push into a laterally open passage 16d of the connector 16, as shown in the embodiment of FIGS. 3a and 3b, and engages in a mounting groove 18b of the second streamlined-section strut 14. In this mounting groove 18b of the second strut 14, hammer head nuts 24 are used, into which the threaded bolts 22 are screwed, until the head of the threaded bolt 22 comes to lie in a receiving recess 16e surrounding the passage 16d and the hammer head nuts 24 are securely twisted into the mounting groove 18b. For facilitation of assembly, the hammer head nuts 24 can be already screwed onto the threaded bolts 22, when these are positioned into the mounting groove 18b of the streamlined-section strut 12. The narrow side of the hammer head nuts 24 is dimensioned, such that without further, they can be inserted into the mounting groove 18b of the streamlined-section strut 14. Upon tightening of the threaded bolts 22, the hammer head nuts twist and wedge themselves into the mounting groove 18b.

Figure 5A:
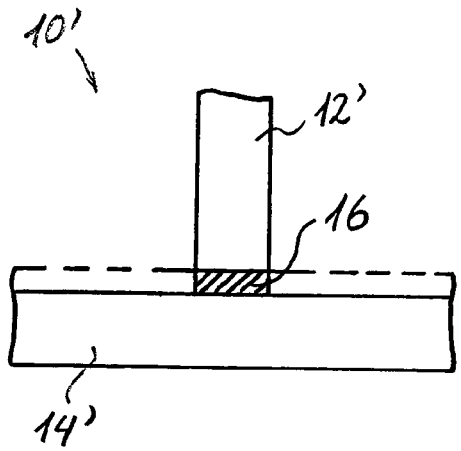
FIGS. 5a through 5d show schematic sketches for explanation of various types of connections, namely, a T-connection (FIG. 5a), an L-connection (FIG. 5b), an X-connection (FIG. 5c), and an Xo-connection (FIG. 5d).

Although the T-connection 10 according to FIGS. 1a and 1b is formed by using two struts 12, 14 with a T-cross section, that is, two struts with rectangular round cross section 18 and two edge flanges 18c, it can easily be seen that the same type of connection can be created also with struts with an L-shaped cross section, that is, struts with a rectangular base cross section and only one edge flange, or with struts with a pure rectangular cross section. One example of this type of T-connection 10' is shown in FIG. 5a.

Figure 5B:
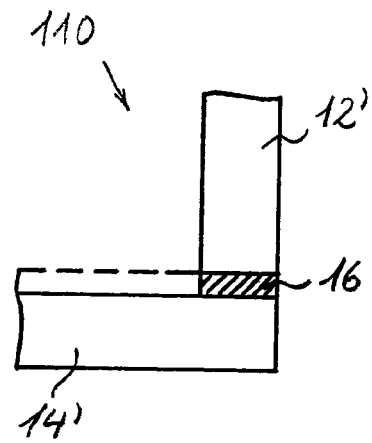

The L-connection 110' according to FIG. 5b differs from the T-connection 10' merely in that the first streamlined section strut 12' is attached by means of the connector 16 in an area of a longitudinal end of the second streamlined-section strut 14'. An analogous L-connection 110 is designated in FIG. 1b by the dashed line A.

Figure 5C:
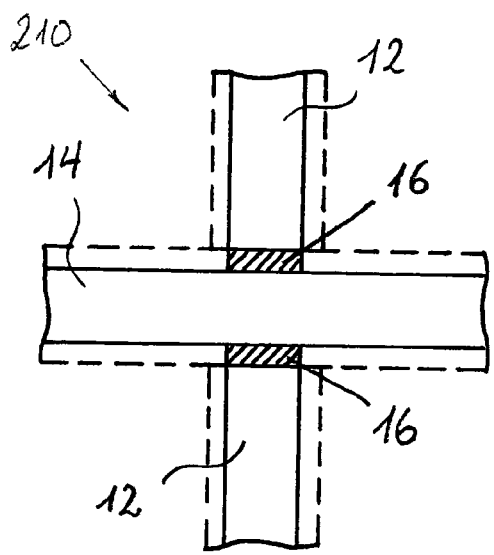

The X-connection 210 according to FIG. 5c is created on the basis of a T-connection in that on the side of the second streamlined-section strut 14 opposite to the first streamlined-section strut 12, again a first streamlined-section strut 12 is mounted by means of a connector 16.

Figure 5D:
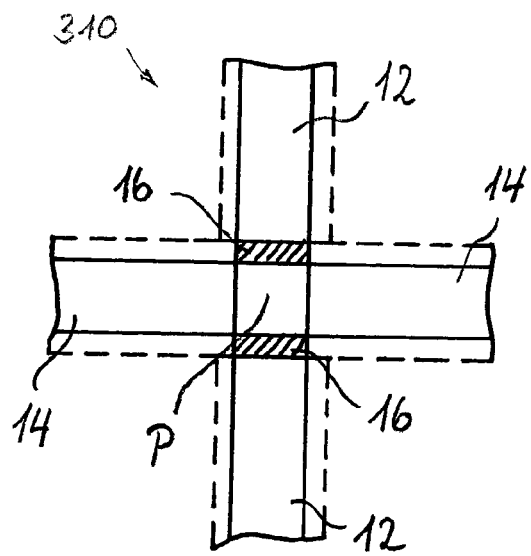

Finally, in FIG. 5d, a further Xo-connection 310 is shown, in which with the use of a second connector 16, a total of four streamlined-section struts are attached to one another, namely, two first struts 12 and two second struts 14 are used, whereby in the area of the intersecting point P, a space free of struts remains, in which functional units can be accommodated, for example, smoke detectors, sprinkler heads, or the like. The detailed structure of such an Xo-connection is described in greater detail below with reference to FIGS. 1a and 2b.

Figure 4:
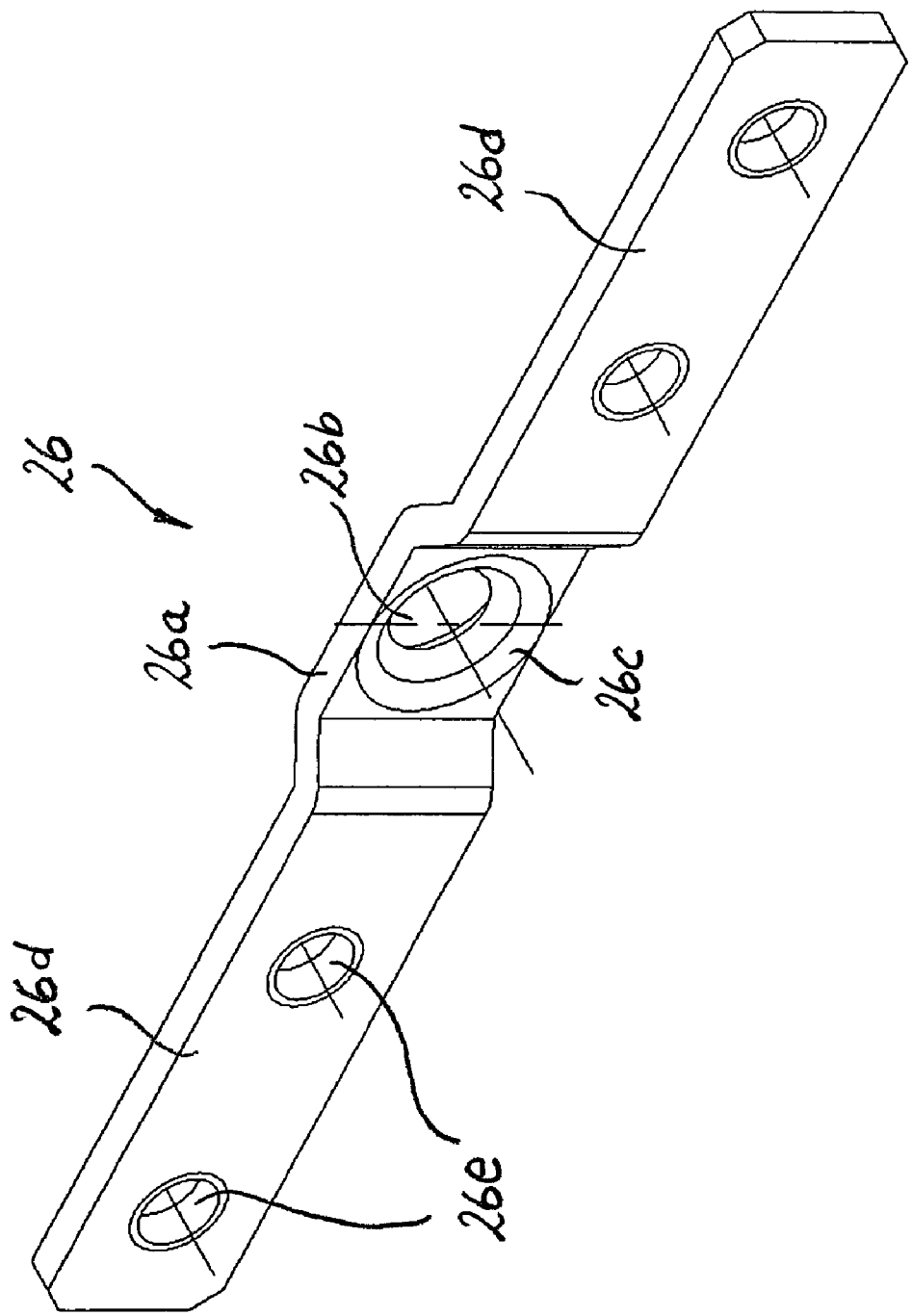
FIG. 4 shows a perspective view of an auxiliary element for making a To- or Xo-connection.

According to 2a, first an auxiliary clamp 26 (shown in detail in FIG. 4) is attached by means of the countersunk screw 20 simultaneously with the connector 16 to the first streamlined-section strut 12. The auxiliary clamp 26 has in its central section 26a a flat circular hole 26b, which is surrounded by a recess 26c for the head of the countersunk screw 20. In addition, the connector according to FIG. 3a is formed on its back side with a receiving recess 16f for the central section 26a of the auxiliary clamp 26. By means of the countersunk screw 20, the auxiliary clamp 26 on the connector 16 as well as the connector 16 is attached to the streamlined-section strut 12.

Figure 2A:
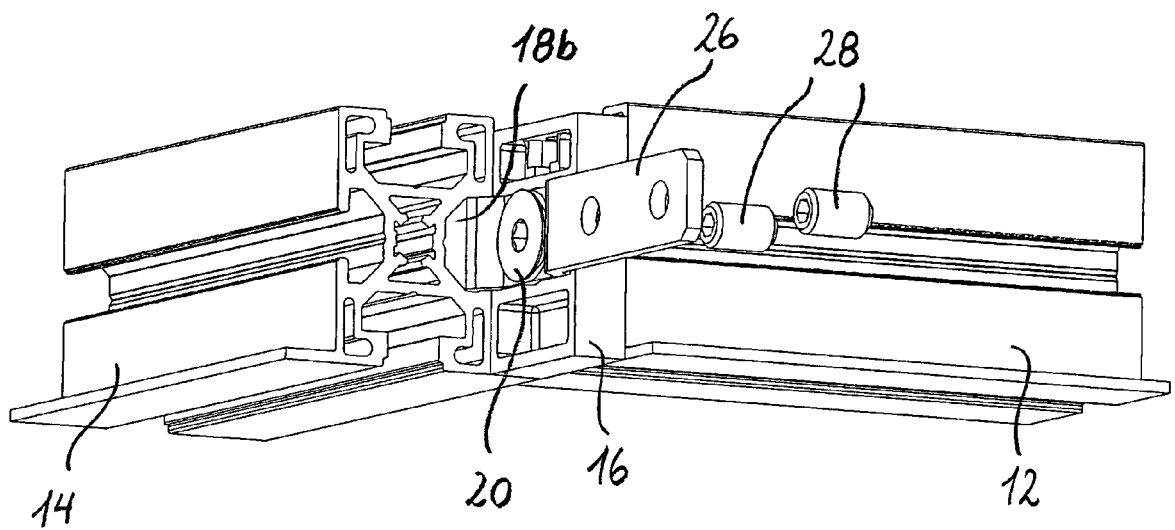
FIGS. 2a and 2b show perspective views for explanation of making of an Xo-connection of two streamlined-section struts.

From the central section 26a of the auxiliary clamp 26, two wing-type shoulders 26d project from the side, which, according to FIG. 2a, can be inserted from the front side of the second strut 14 into a mounting groove 18b of this second strut 14. In each of the wings 26d of the auxiliary clamp 26, two threaded bores 26e are provided, in which slugs 28 can be inserted, until they are supported on the base of the mounting groove 18b and the wings 26d are tightened in this mounting groove 18b, whereby both streamlined-section struts 12, 14 are secured to one another.

Alternatively to the slugs 28, also screws with large heads or a large washer can be used. The advantage of using slugs is that these are accommodated completely in the mounting groove 18b in the mounted state, so that the mounting of the ceiling plates and the like is not hindered, and without requiring an additional machining step on the streamlined-section strut 14.

By repeating the connection procedure described with reference to FIG. 1a with a total of four streamlined-section struts, namely, two first struts 12 and two second struts 14, as well as two connectors 16 and two auxiliary clamps 26, one would obtain the Xo-connection 310 shown in FIG. 2b. In this arrangement shown in FIG. 2b, the slugs 28 are not illustrated.

Figure 2B:
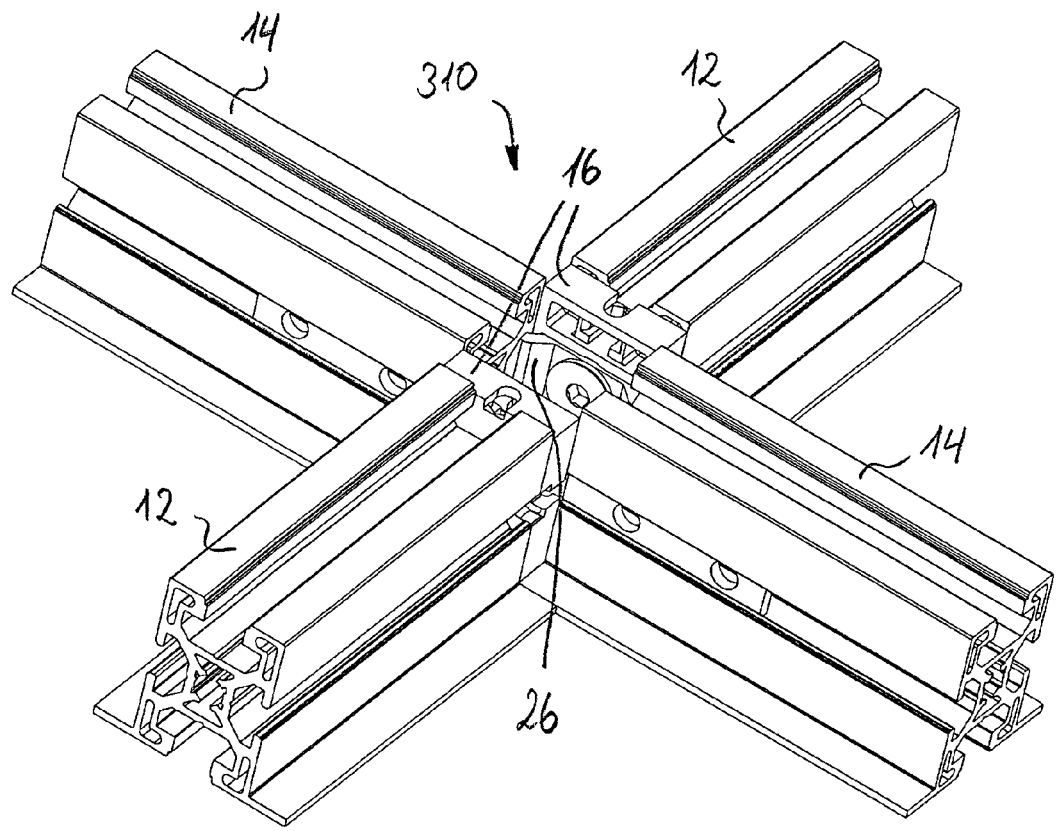

It should be noted that the connector 16 with the Xo-connection according to FIGS. 2a and 2b, compared with the T-connection according to FIGS. 1a and 1b, is used in a reverse orientation, that is, in an orientation rotated 180° about the longitudinal strut axis L. Since at the same time, the center of the circular hole 16a according to FIG. 3b does not divide the height X of the connector 11 in half, rather has the distance $X_1$ from the one high edge, which corresponds to half of the height H of the strut cross section 18 ($X_1$=H/2), and the distance $X_2$ from the other high edge, which corresponds to half of the height H of the strut cross section 18 reduced by the height h of the edge flange 18c ($X_2$=H/2−h), the lower surfaces of the streamlined-section strut assembly facing the space run essentially continuous, since the upper surfaces of the struts 12, 14 and of the connector 16 are essentially flush with one another, as shown in FIG. 2a.

It should also be noted that the connector 16 can be formed in its front and back side with further, diverse recesses or depressions 16g and 16h, in order to provide a more light-weight connector.

It will be understood that each of the elements described above, or two or more together, may also find a useful application in other types of constructions differing from the types described above.

While the invention has been illustrated and described herein as a connection of streamlined-section struts, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A connection of a first streamlined-section strut with at least one second streamlined-section strut by using a connector,
   wherein the at least one second streamlined-section strut runs substantially orthogonally to the first streamlined-section strut,
   wherein the streamlined-section struts have a substantially rectangular base cross-section,
   wherein the at least one second streamlined-section strut has a mounting groove in at least one lateral surface and at least one edge flange,
   wherein said edge flange projects substantially orthogonally from an edge of the lateral surface outwardly of the lateral surface and outwardly beyond the substantially rectangular base cross-section of the at least one second streamlined-section strut to accommodate the connector substantially completely with said at least one edge flange, and projects toward the first streamlined-section strut at a predetermined distance and with a predetermined thickness,
   wherein the connector is securable to a front side of the first streamlined-section strut and also is securable to the lateral surface having the mounting groove of the at least one second streamlined-section strut,
   wherein dimensioning of the connector is essentially the same as the predetermined distance in an orthogonally running direction to the lateral surface;
   wherein for attachment of the connector to the lateral surface of the at least one second streamlined-section strut, an auxiliary element with at least one attachment shoulder projecting transversely over the cross section of the first streamlined-section strut can be attached, wherein the attachment shoulder can be inserted in the mounting groove and is securable in said mounting groove; and
   wherein the auxiliary element is attachable to the connector by means of the same attachment elements that also serve to attach the connector to the front side of the first streamline-section strut.

2. A connection of a first streamlined-section strut with at least one second streamlined-section strut by using a connector of substantially quadrilateral shape,
   wherein the at least one second streamlined-section strut runs substantially orthogonally to the first streamlined-section strut,
   wherein the streamlined-section struts have a substantially rectangular base cross-section,
   wherein the at least one second streamlined-section strut has a mounting groove in at least one lateral surface and at least one edge flange,
   wherein said edge flange projects substantially orthogonally from an edge of the lateral surface outwardly of the lateral surface and outwardly beyond the substantially rectangular base cross-section of the at least one second streamlined-section strut to accommodate the connector substantially completely with said at least one edge flange, and projects toward the first streamlined-section strut with a predetermined width in said orthogonal direction and with a predetermined thickness,
   wherein the connector is securable to a front side of the first streamlined-section strut and also is securable to the lateral surface having the mounting groove of the at least one second streamlined-section strut, and
   wherein, when the connector is connected to the streamlined-section struts, a depth of the connector measured in a direction running orthogonally to the lateral surface of the at least one second streamlined-section strut is substantially the same as the predetermined width of the edge flange such that the surface of the connector that faces away from the lateral surface of the second streamlined-sectioned strut connects essentially flush with the outer edge of the edge flange of the second streamlined-sectioned strut and the front side of the first streamlined-section strut.

3. The connection according to claim 2, wherein the connector has at least one through opening for attachment to the front side of the first streamlined-section strut, wherein an attachment element can be inserted into said through opening in an associated attachment recess provided in the front side of the first streamlined-section strut.

4. The connection according to claim 3, wherein the connector for attachment to the lateral surface of the at least one second streamlined-section strut has at least one through opening, through which a further attachment element can be inserted into the mounting groove of the at least one second streamlined-section strut.

5. The connection according to claim 4, wherein the connector has receiving recesses encompassing the through openings, wherein the receiving recesses serve for receiving heads of the attachment elements (20, 22).

6. The connection according to claim 5, wherein in the upper surface of the connector facing the first streamlined-section strut and/or in the upper surface of the connector facing away from the first streamlined-section strut, at least one further recess is provided.

7. The connection according to claim 2, wherein for attachment of the connector to the lateral surface of the at least one second streamlined-section strut, an auxiliary element with at least one attachment shoulder projecting transversely over the cross section of the first streamlined-section strut can be attached, wherein the attachment shoulder can be inserted in the mounting groove and is securable in said mounting groove.

8. The connection according to claim 7, wherein the connector has a recess for receiving an attachment section of the auxiliary element.

9. The connection according to claim 7, wherein the auxiliary element can be attached to the connector by means of the same attachment elements that also serve to attach the connector to the front face of the first streamlined-section strut.

10. The connection according to claim 2, wherein the streamlined-section struts and the connector, in a connected state, are essentially flush with one another.

11. The connection according to claim 2, wherein a contour of the connector is arranged at least about the predetermined thickness of the edge flange within the base cross section of the streamlined-section struts.

12. The connection according to claim 2, wherein at least one projection is provided on a side of the connector facing toward the first streamlined-section strut, wherein the at least one projection can be inserted in an associated recess in the front face of the first streamlined-section strut in a form-fitting manner.

13. The connection according to claim 2, wherein the mounting groove (18b) is a longitudinal groove opened toward the lateral surface, and wherein the mounting groove is undercut on both sides of an opening of the mounting groove.

* * * * *